US012780400B2

(12) United States Patent
Movva et al.

(10) Patent No.: US 12,780,400 B2
(45) Date of Patent: Nov. 3, 2026

(54) ROLLER ARRANGEMENT FOR A MOVABLE CONTROL SURFACE OF AN AIRCRAFT

(71) Applicant: Gulfstream Aerospace Corporation, Savannah, GA (US)

(72) Inventors: Linga Rajagopal Movva, Savannah, GA (US); Anthony V Edwards, Savannah, GA (US); Nicholas Meinhardt, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 66 days.

(21) Appl. No.: 18/916,363

(22) Filed: Oct. 15, 2024

(65) Prior Publication Data

US 2026/0109448 A1 Apr. 23, 2026

(51) Int. Cl.
*B64C 9/02* (2006.01)
*B64C 13/24* (2006.01)
*B64F 5/40* (2017.01)

(52) U.S. Cl.
CPC ................ *B64C 9/02* (2013.01); *B64C 13/24* (2013.01); *B64F 5/40* (2017.01); *F16C 2326/43* (2013.01)

(58) Field of Classification Search
CPC ............................... B64C 9/02; F16C 2326/43
See application file for complete search history.

(56) References Cited

U.S. PATENT DOCUMENTS

| | | | | |
|---|---|---|---|---|
| 8,876,065 | B2 * | 11/2014 | Grieco | B64C 9/16 244/99.2 |
| 11,292,582 | B2 * | 4/2022 | Budnitsky | B64C 9/16 |
| 11,905,016 | B2 * | 2/2024 | Trinchillo | B64C 9/22 |
| 2011/0042525 | A1 * | 2/2011 | Parker | B64C 9/16 244/213 |
| 2013/0099061 | A1 | 4/2013 | Grieco et al. | |
| 2024/0067327 | A1 | 2/2024 | Edwards | |

* cited by examiner

*Primary Examiner* — Richard G Davis
(74) *Attorney, Agent, or Firm* — Ingrassia Fisher & Lorenz, LLP

(57) ABSTRACT

A roller arrangement for a moveable control surface of an aircraft component includes a roller, a fitting, and an adapter sleeve. The roller component has a shaft and a wheel coupled to a roller end of the shaft, wherein the wheel is configured to rotate about a major longitudinal axis of the shaft. The fitting is couplable to the moveable control surface, and it includes a support opening defined therein. The support opening is shaped, sized, and configured to accommodate passage of the wheel therethrough. The adapter sleeve includes an interior passageway defined therein, wherein the interior passageway is shaped, sized, and configured to removably receive and couple with the shaft of the roller component. The adapter sleeve is removably secured to the fitting, to inhibit lateral movement of the adapter sleeve relative to the fitting.

16 Claims, 12 Drawing Sheets

ROLLER ARRANGEMENT FOR A MOVABLE CONTROL SURFACE OF AN AIRCRAFT

TECHNICAL FIELD

Embodiments of the subject matter described herein relate generally to aircraft assemblies and components. More particularly, embodiments of the subject matter relate to a roller and corresponding assembly for a moveable control surface of an aircraft.

BACKGROUND

Aircraft (such as an airplane) include moveable control surfaces that are actuated to adjust the flight attitude of the aircraft. Ailerons, elevators, rudders, spoilers, flaps, slats, and air brakes are moveable control surfaces that can be controlled by aircraft pilots. A moveable control surface may include or cooperate with a suitable control/actuation system that regulates the movement and position of the moveable control surface.

Some aircraft utilize a track to which a moveable control surface is coupled. Deployment of the moveable control surface results in movement that is guided by, restricted by, or otherwise defined by the layout, configuration, and design of the track. For example, a wing of an aircraft may include a number of flap tracks that support and guide one or more moveable flaps. A moveable flap can be coupled to at least one flap track using flap rollers that allow the flap to move smoothly from a stowed position to a deployed position. The flap rollers are secured to the flap using flap fittings.

Over time, a flap roller experiences normal wear and tear due to physical contact with the track. Accordingly, flap rollers are fabricated and configured to be serviceable (replaceable) components. Unfortunately, replacing flap rollers results in downtime of the aircraft, and the maintenance and replacement cost (components and maintenance personnel) can be significant.

Removing a roller from a flap fitting has historically been a very time consuming and labor intensive activity. Roller assemblies are retained in flap fittings by clamping force. Conventional roller assemblies and flap fittings are designed such that, in order to remove the roller assembly from the flap fitting, the roller assembly has to translate out of the flap fitting in a direction towards the flap track. This is due to the construction, configuration, and installation environment of the roller assemblies. A conventional roller assembly includes a generally cylindrical shaft and a roller portion that is rotatably mounted to the shaft at or near one end of the shaft. The other end of the shaft is conventionally inserted into an opening in the flap fitting to support the roller portion in a cantilever manner. The shaft and the opening in the fitting are typically dimensioned so as to have substantially the same diameter so as to minimize any rocking motion of the shaft that might result as the flaps are extended and retracted. Conventionally, the roller portion has a larger diameter than the shaft. The larger diameter of the roller portion obstructs translating movement of the roller assembly through the opening in the flap fitting, leading to the result that a conventional roller assembly can only be removed by translating the roller assembly out of the opening in the fitting in a direction towards the flap track.

Because the flap track obstructs such translating movement, the flaps are typically removed from the wing in order to remove the roller assemblies. Removal of the flaps from the wing can trigger additional rigging/inspection requirements when the flaps are reinstalled. These additional rigging/inspection requirements can add to the down-time experienced by an aircraft when a roller assembly needs to be serviced. Due to the labor requirements and the added rigging/inspection requirements, when the flap is removed from the wing to replace a single roller assembly, maintenance crews will typically replace all roller assemblies so as to avoid the need to frequently remove, reinstall, and then recertify the flaps. As a result, roller assemblies are often replaced when replacement is not necessary, leading to waste and added expense.

Accordingly, it is desirable to provide a roller arrangement and deployment environment that permits easy removal and replacement of the flap rollers. Furthermore, other desirable features and characteristics will become apparent from the subsequent detailed description and the appended claims, taken in conjunction with the accompanying drawings and the foregoing technical field and background.

BRIEF SUMMARY

The subject matter disclosed herein relates to an improved flap roller arrangement that is suitable for use in aircraft applications. Embodiments of the disclosed invention facilitate removal and replacement of flap rollers in an easier and efficient manner, relative to traditional methodologies.

A roller arrangement for a moveable control surface of an aircraft component is disclosed herein. Certain embodiments of the roller arrangement include: a roller component having a shaft and a wheel coupled to a roller end of the shaft, the wheel configured to rotate about a major longitudinal axis of the shaft; a fitting couplable to the moveable control surface, the fitting comprising a support opening defined therein, the support opening shaped, sized, and configured to accommodate passage of the wheel therethrough; an adapter sleeve comprising an interior passageway defined therein, the interior passageway shaped, sized, and configured to removably receive and couple with the shaft of the roller component; and means for removably securing the adapter sleeve to the fitting, to inhibit lateral movement of the adapter sleeve relative to the fitting.

Also disclosed herein is a moveable control surface assembly for a component of an aircraft. Certain embodiments of the moveable control surface assembly include: a moveable control surface; a fitting coupled to the moveable control surface, the fitting comprising a support opening defined therein; and a roller assembly removably mounted within the support opening, the roller assembly configured for rolling engagement with a track of the component. The roller assembly may include: a roller component having a shaft and a wheel coupled to a roller end of the shaft, the wheel configured to rotate about a major longitudinal axis of the shaft, wherein the support opening of the fitting is shaped, sized, and configured to accommodate passage of the wheel therethrough; and an adapter sleeve comprising an interior passageway defined therein, the interior passageway shaped, sized, and configured to removably receive and couple with the shaft of the roller component.

Also disclosed herein is a roller assembly for an aircraft having an aerodynamic component, a moveable control surface associated with the aerodynamic component, a track coupled to the aerodynamic component, and a fitting coupled to the moveable control surface. Certain embodiments of the roller assembly include: a roller component having a shaft and a wheel coupled to a roller end of the shaft, the wheel configured to rotate about a major longitudinal axis of the shaft, wherein the wheel is configured to engage the track, and wherein the wheel is shaped, sized, and configured to pass through a support opening of the fitting; an adapter sleeve comprising an interior passageway defined therein, the interior passageway shaped, sized, and configured to removably receive and couple with the shaft of the roller component; and means for removably securing the adapter sleeve to the fitting, to inhibit lateral movement of the adapter sleeve relative to the fitting.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
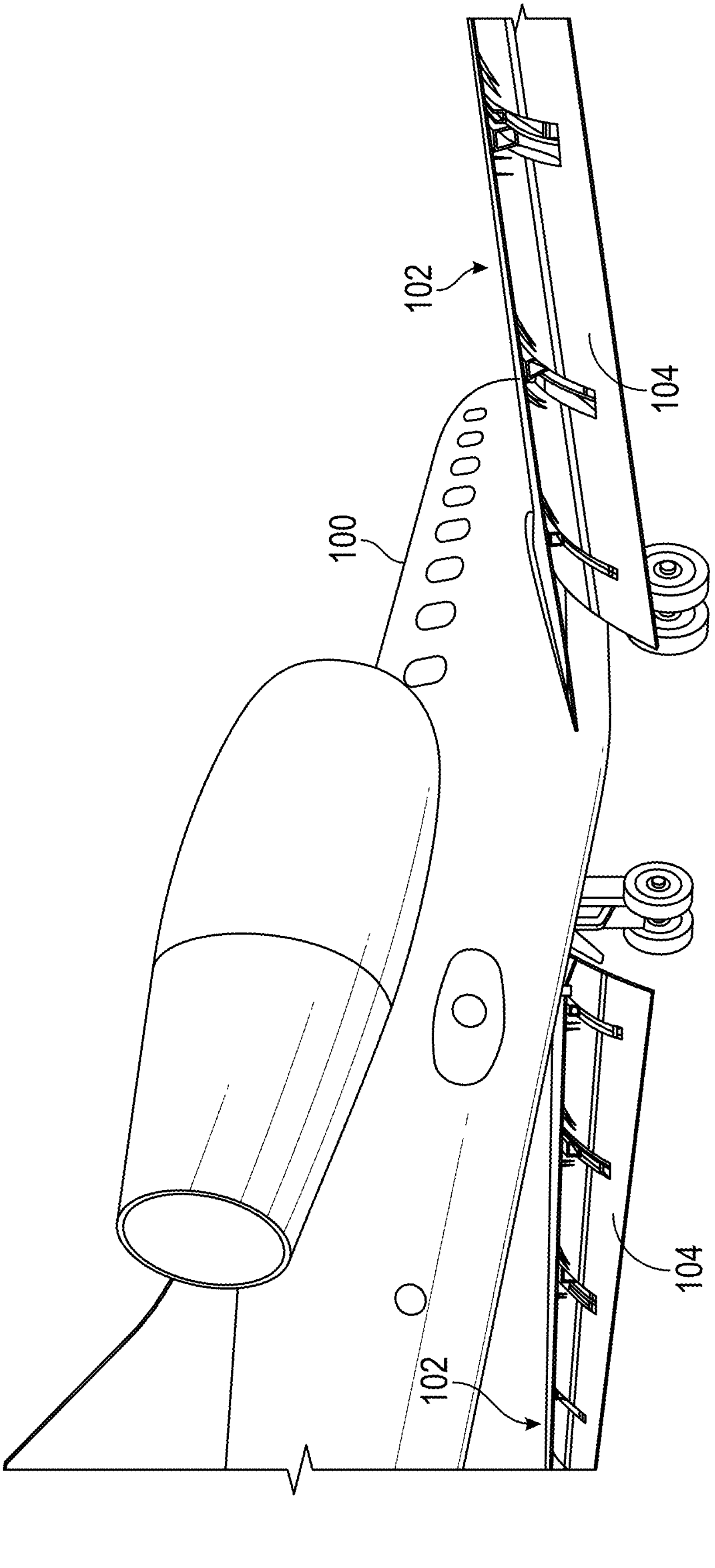
FIG. 1 is a rear perspective view of an aircraft with its moveable flaps deployed.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

A moveable control surface of a vehicle component (and associated actuation assemblies and components) and associated support and actuation components are disclosed herein. In accordance with certain non-limiting embodiments, the moveable control surface is deployed onboard an aircraft such as an airplane. However, it should be appreciated that embodiments of the disclosed subject matter can be utilized for other vehicle applications including, without limitation: trains; helicopters; automobiles; watercraft; submarines; monorails; amusement park rides; transportation systems; spacecraft; or the like. For the sake of brevity, conventional techniques related to aircraft control and actuation systems, moveable control surfaces such as flaps for an aircraft wing, and other functional aspects of certain components and assemblies may not be described in detail herein.

The exemplary embodiments described here relate to a moveable control surface assembly for a component of an aircraft (e.g., a wing, a vertical stabilizer, a horizontal stabilizer). In accordance with the non-limiting example provided here, the component is an aircraft wing and the moveable control surface is a flap for the wing. The disclosed subject matter can be used in an equivalent manner for other aircraft components and their related moveable control surfaces if so desired.

Figure 2:
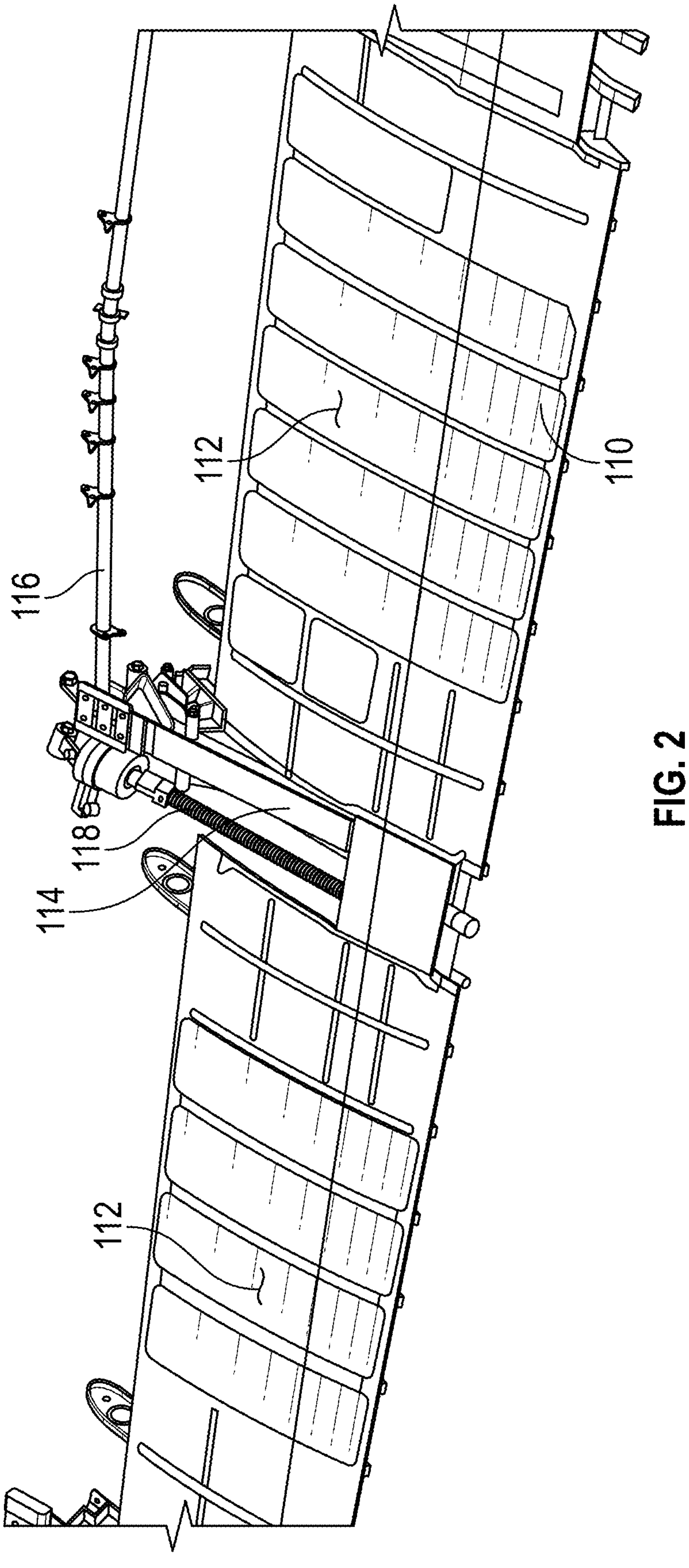
FIG. 2 is a perspective view of a portion of a moveable flap and associated components for deploying the moveable flap.

Turning now to the drawings, FIG. 1 is a rear perspective view of an aircraft 100. The aircraft has two wings 102, and each wing 102 has a respective moveable flap 104 (a control surface) movably coupled thereto. FIG. 1 depicts the aircraft with its moveable flaps 104 deployed (extended in the aft direction and angled slightly downward). FIG. 2 is a perspective view of a portion of a moveable control surface (e.g., a moveable flap 110) and associated components for deploying the moveable flap 110. In FIG. 2, some structure, features, and/or components have been removed (partially or entirely) to make it easier to view items that would otherwise be hidden from view. For example, a portion of the external skin 112 of the moveable flap 110 has been removed from the leading edge of the moveable flap 110. Moreover, FIG. 2 does not depict the wing of the aircraft (to which the moveable flap 110 is coupled), even though some of the components and structure shown in FIG. 2 are attached to, integrated with, or carried by structure of the wing.

The moveable flap 110 is supported by at least one track 114. FIG. 2 shows a portion of the moveable flap 110 and only one track 114. In certain embodiments, the aircraft includes four tracks 114 for each moveable flap 110. The track 114 is configured to be coupled to a structure of the aircraft in a fixed position relative to the structure. In accordance with certain embodiments, the track 114 is coupled to the wing of the aircraft in a fixed position such that the moveable flap 110 moves (when actuated) relative to the track 114. In alternative embodiments, moveable or hinged tracks for control surfaces can utilize the disclosed concepts. The moveable flap 110 is actuated via at least one drive shaft 116 and at least one ball screw linear actuator 118. Operation of the drive shaft 116 causes the linear actuator 118 to rotate, which in turn causes the moveable flap 110 to move along the track 114.

Figure 3:
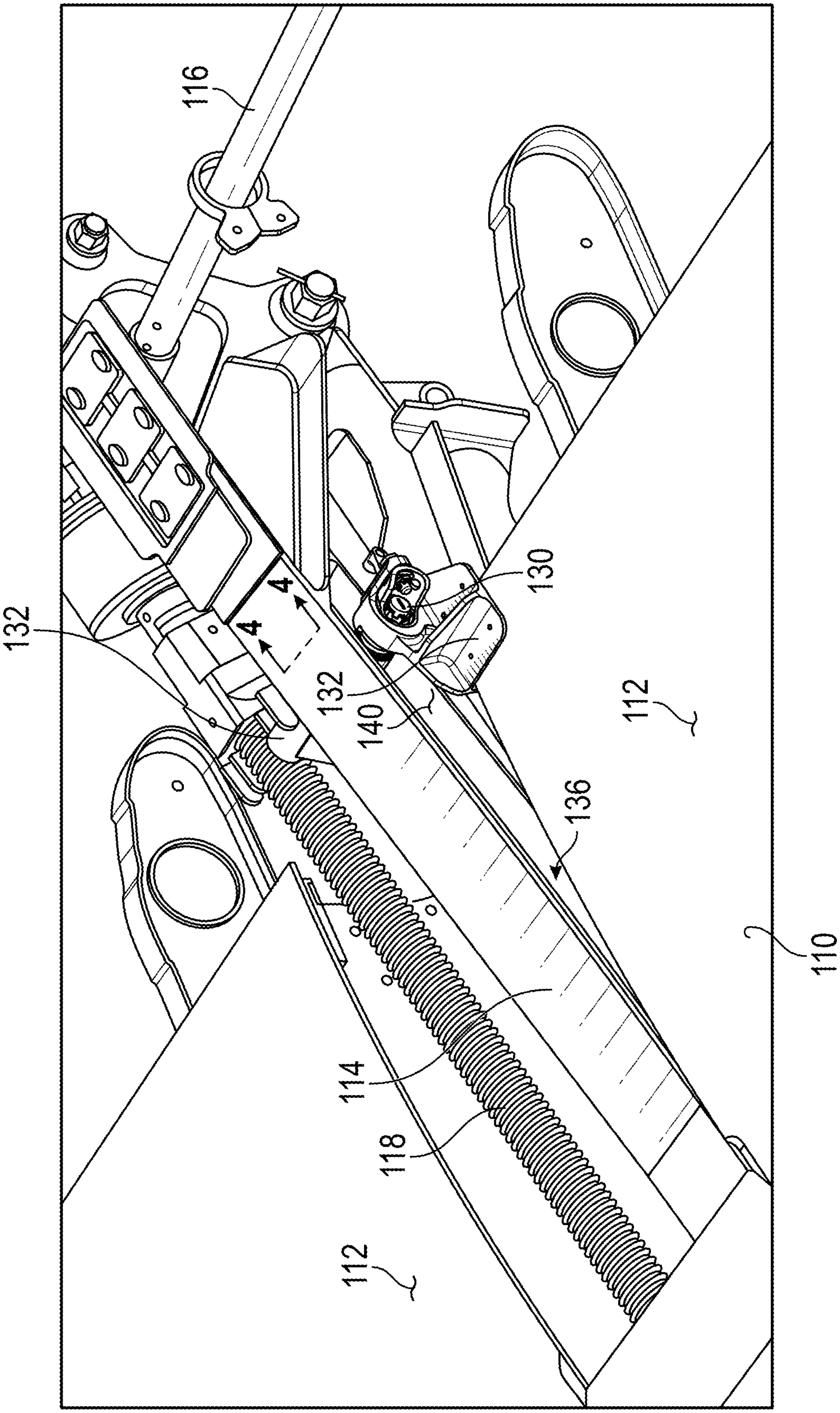
FIG. 3 is a perspective view that depicts aircraft components that cooperate to deploy a moveable flap.
Figure 4:
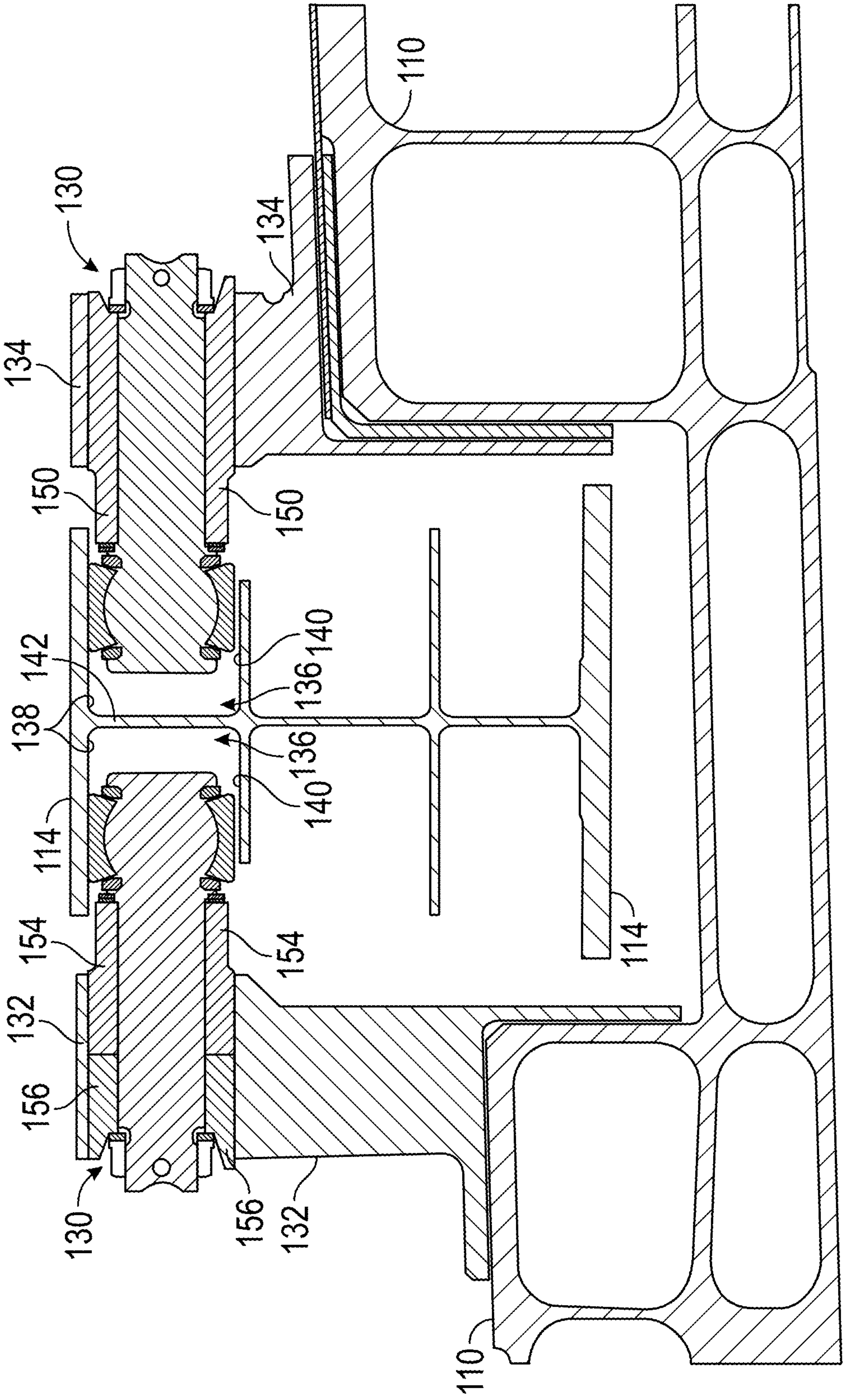
FIG. 4 is a longitudinal cross sectional view that schematically depicts some of the aircraft components shown in FIG. 3.

FIG. 3 is a perspective view that depicts aircraft components that cooperate to deploy the moveable flap 110, and FIG. 4 is a longitudinal cross sectional view that schematically depicts some of the aircraft components shown in FIG. 3. FIG. 3 corresponds to a more detailed view of some of the components shown in FIG. 2. In this regard, FIG. 3 shows the flap 110, the external skin 112, the track 114, a portion of the drive shaft 116, and the linear actuator 118 that also appear in FIG. 2. As mentioned above with reference to FIG. 2, some components, features, hardware, and/or portions thereof that would otherwise be visible in a deployment of the illustrated aircraft have been removed from FIG. 3 to provide an unobstructed view of underlying structure. FIG. 4 generally corresponds to a sectional view along the line 4-4 in FIG. 3.

Referring to FIGS. 2-4, the track 114 (which is implemented as a flap track for the illustrated embodiment) is a support structure that is shaped, sized, and configured to be coupled to a mounting structure of the aircraft. More specifically, the track 114 is coupled to mounting structure of the wing of the aircraft, and is held in a fixed position relative to the wing. The track 114 is assembled or fabricated from a strong and durable material, such as steel or aluminum, or from a combination of strong and durable materials.

Again, for clarity and ease of illustration, the wing and the aircraft mounting structure to which the track 114 is coupled are not shown in FIGS. 2-4. The moveable flap 110 is moveably coupled to the track 114 via at least one roller assembly 130 and at least one roller fitting 132, 134. Accordingly, the track 114 supports the moveable flap 110 while allowing the moveable flap 110 to move between a stowed position and a deployed position. To this end, the track 114 is suitably configured to accommodate at least one roller assembly 130 during actuation of the moveable flap 110. For example, a track at one location of the moveable flap 110 may accommodate and carry only two roller assemblies 130, while a track at another location of the moveable flap 110 may accommodate and carry four roller assemblies 130. Regardless of the particular configuration and "roller capacity" of the track 114, movement of the roller assemblies 130 is restrained or defined by the track 114. Each roller assembly 130 is coupled to the moveable flap 110 by a respective roller fitting 132, 134. The roller fittings 132, 134 can be attached in a fixed position relative to the moveable flap 110. Alternatively, the roller fittings 132, 134 may be integrated with the moveable flap 110 or otherwise implemented as part of the moveable flap 110.

The depicted embodiment of the track 114 includes two channels 136 (one for each depicted roller assembly 130). The channels 136 are aligned and oriented to generally correspond with the fore/aft direction of the aircraft. The orientation of the channels 136 accommodates the desired translation and rotation of the moveable flap 110. A channel 136 can be defined by an upper inner surface 138, a lower inner surface 140 opposing the upper inner surface 138, and a web 142 extending between the upper inner surface 138 and the lower inner surface 140 (see FIG. 4). As shown in FIG. 4, a first portion of each roller assembly 130 is installed to reside within a support opening of a respective roller fitting 132, 134, such that a second portion of the roller assembly 130 is positioned outside of the roller fitting 132, 134 to cooperate and engage with the track 114. As explained in more detail below, the roller assembly 130 includes a roller component and a cooperating adapter sleeve that can be removably coupled to the roller fitting 132, 134 (and the adapter sleeve, in turn, removably couples the roller assembly 130 to the roller fitting 132, 134). In certain embodiments, the roller component includes a wheel that is configured to engage the track 114 and rotate about an axis to accommodate guided movement of the roller assembly 130 and its associated roller fitting 132, 134 relative to the supporting track 114.

FIGS. 1-4 illustrate a typical aircraft implementation of a moveable control surface assembly for an aircraft having an aerodynamic component, e.g., a moveable flap 104, 110 for a wing 102 of the aircraft 100. In this context, a moveable control surface assembly may include or cooperate with the following items, without limitation: a moveable control surface (e.g., a flap 104, 110); at least one fitting 132, 134 coupled to the moveable control surface; and at least one roller assembly 130 that cooperates with each fitting 132, 134. Each roller assembly 130 is suitably configured for rolling engagement with a track 114 of the aircraft component (e.g., a wing 102). As explained in more detail below, each roller assembly 130 can be removably coupled to a fitting 132, 134, and is designed to be quickly and easily removed and replaced as needed for maintenance.

Figure 5:
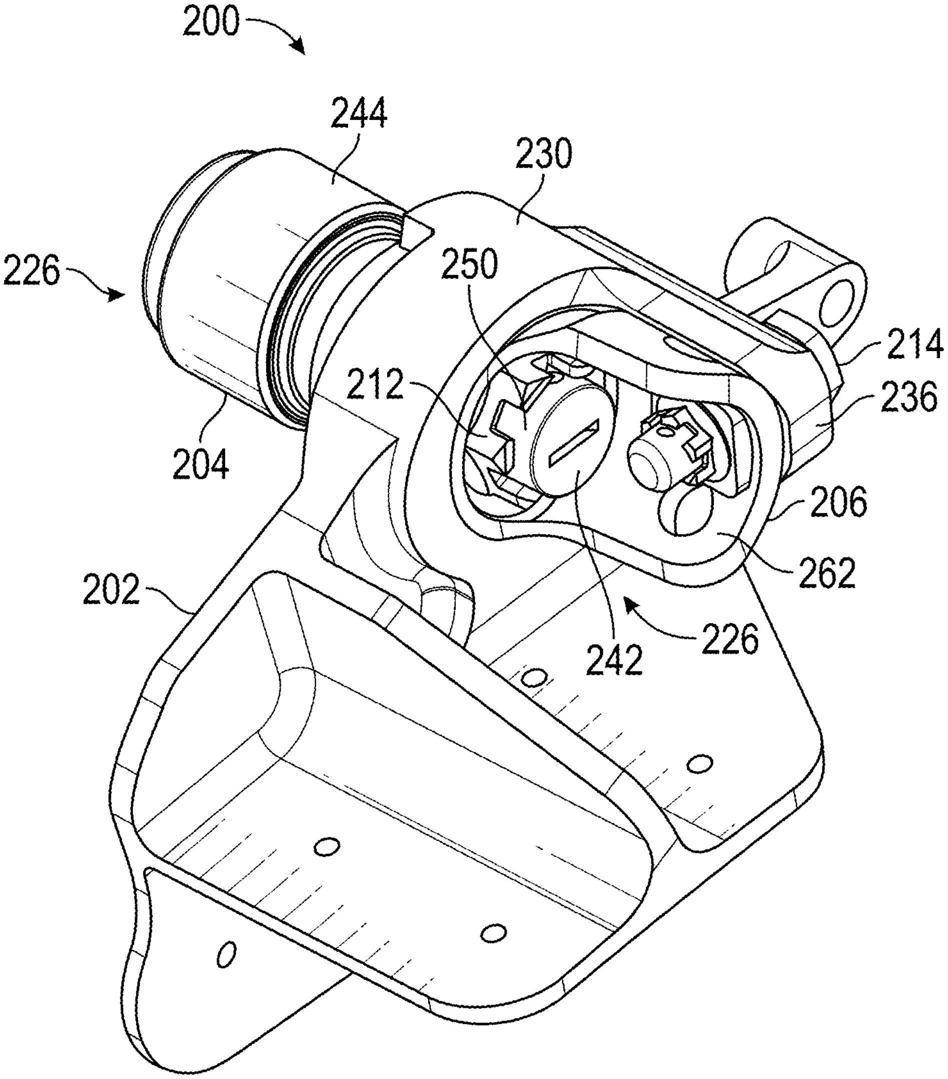
FIG. 5 is a perspective view of a roller arrangement for a moveable control surface of an aircraft component, configured in accordance with an exemplary embodiment of the invention.
Figure 6:
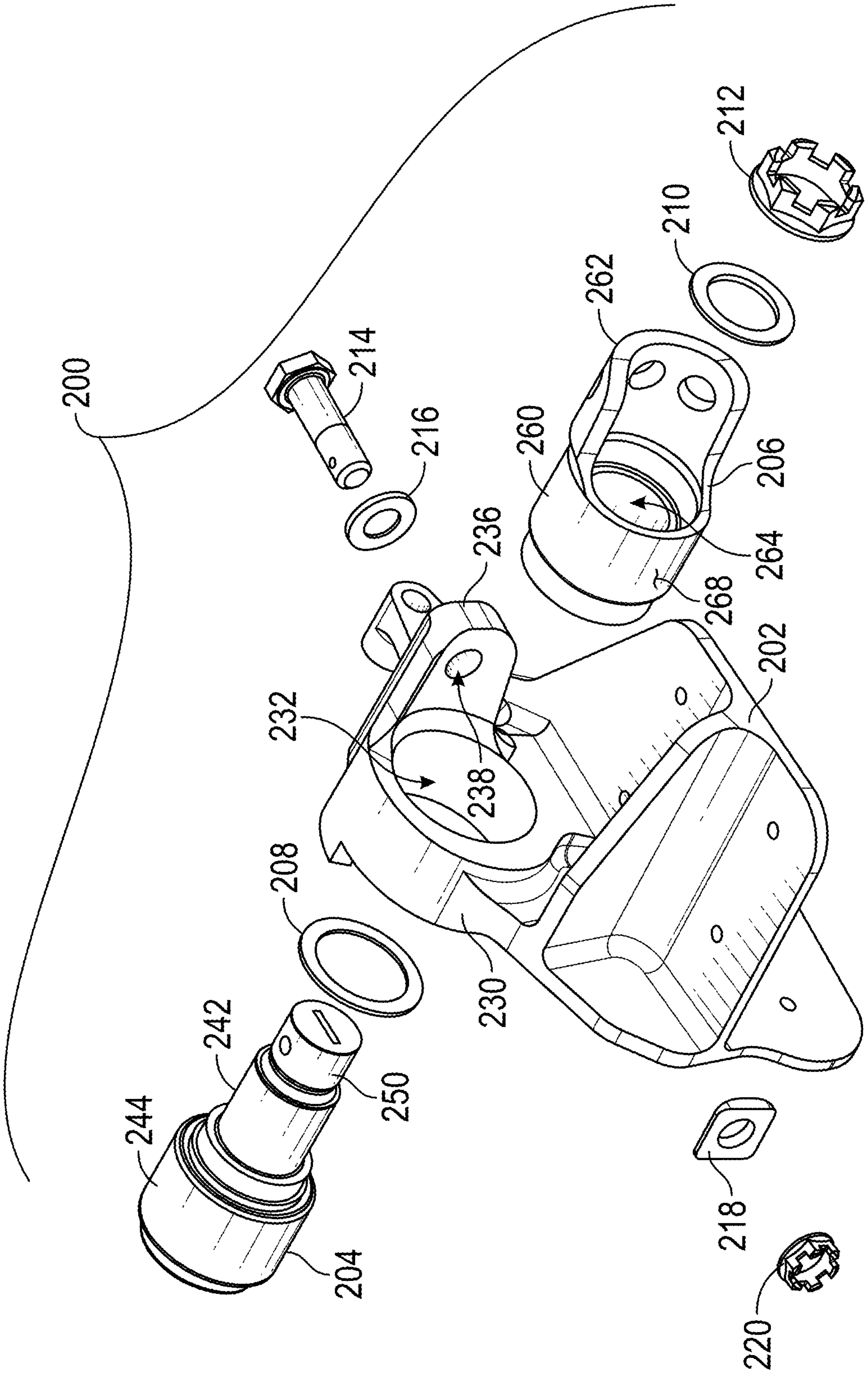
FIG. 6 is an exploded perspective view of the roller arrangement shown in FIG. 5.

FIG. 5 is a perspective view of an exemplary embodiment of a roller arrangement 200 for a moveable control surface of an aircraft component, and FIG. 6 is an exploded perspective view thereof. In a practical deployment, a mirror image implementation of the roller arrangement 200 can be utilized to flank a corresponding track 114, similar to the configuration shown in FIG. 4. For simplicity and ease of illustration, the roller arrangement 200 is shown without any of the cooperating components that would ordinarily appear in the surrounding environment, e.g., the associated track 114, the moveable control surface, the aircraft component (wing, stabilizer, etc.), or any structural feature of the host aircraft.

The depicted embodiment of the roller arrangement 200 includes, without limitation: a roller fitting 202; a roller component 204; an adapter sleeve 206; a washer 208; a chamfered washer 210; a nut 212; a threaded fastener 214; a washer 216; a support block 218; and a nut 220. The roller component 204, the adapter sleeve 206, the washers 208, 210, and the nut 212 together form a roller assembly 226 (FIG. 7 and FIG. 8) that can be removably mounted to the roller fitting 202. It should be appreciated that FIG. 5 and FIG. 6 illustrate a roller arrangement 200 that is designed, configured, and arranged in an appropriate manner for deployment on a particular airframe, for use with a specified moveable control surface of aerodynamic component (e.g., a flap of a wing), and for installation at a designated location or position. For example, the depicted embodiment of the roller arrangement 200 may be specifically intended for use at a particular track position on a wing (e.g., track A, track B, track C, track D, etc.), and for use at a trailing location of the flap, a leading location of the flap, or an intermediate location of the flap. Accordingly, the actual shape, size, and configuration of the roller fitting 202, the number of roller assemblies 226 supported by the roller fitting 202, the orientation of the roller assembly (or assemblies) 226 relative to the roller fitting 202 and/or relative to each other, and the shape, size, configuration, and arrangement of the components that form the roller assembly 226 can vary from one airframe to another, from one track position to another, from one aircraft component to another, and the like . . . as appropriate for the particular use case and requirements of the intended installation.

The roller fitting 202 includes structure that facilitates coupling to the moveable control surface. The roller fitting 202 has a supporting section 230 (to support the roller assembly 226) with at least one support opening 232 formed or otherwise defined therein. In accordance with the illustrated embodiment, the support opening 232 is a cylindrical through hole having an inner diameter that is sized to accommodate certain structural features of the roller assembly 226. The roller fitting 202 may include an extension, protrusion, flange, or other suitably configured support structure 236 located at or near the supporting section 230. The support structure 236 includes a fitting mounting hole 238 formed therein (see FIG. 6), wherein the hole 238 is sized to accommodate the threaded fastener 214.

Figure 9:
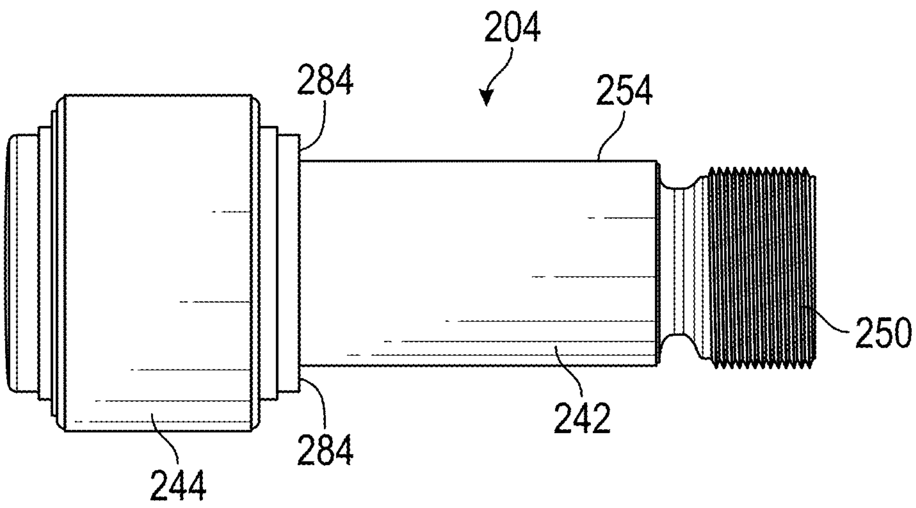
FIG. 9 is an elevation view of an exemplary embodiment of a roller component that is suitable for use with the roller arrangement shown in FIG. 5.

With additional reference to FIG. 9, the roller component 204 includes a shaft 242 and a wheel 244 that is rotatably coupled to the shaft 242. The wheel 244 is configured to rotate about a major longitudinal axis 246 of the shaft 242 (see FIG. 7). The shaft 242 has a roller end (to which the wheel 244 is rotatably coupled) and a threaded mounting end 250 opposite the roller end. FIG. 9 shows threads at the threaded mounting end 250, but the other figures omit the threads for the sake of simplicity and readability. A primary section 254 of the shaft 242 is cylindrical in shape, and is sized and configured to slide into and mate with the adapter sleeve 206. In certain embodiments, the diameter of the wheel 244 is larger than the diameter of the shaft 242 (as depicted in FIG. 9). More specifically, the wheel 244 is larger in diameter than the primary section 254 of the shaft 242.

Figure 10:
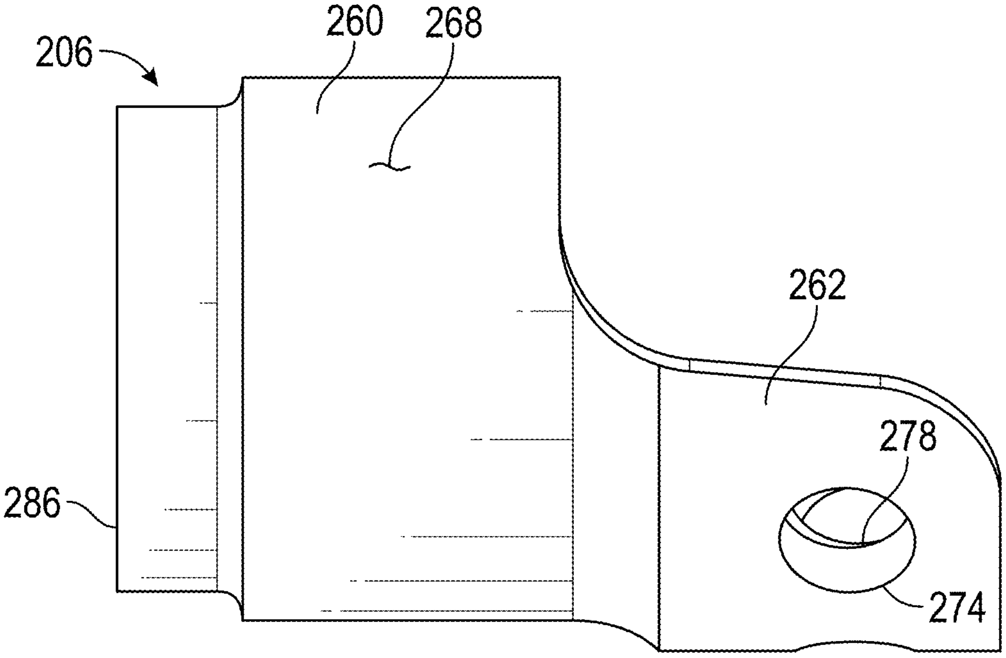
FIG. 10 is a first elevation view of an exemplary embodiment of an adapter sleeve that is suitable for use with the roller arrangement shown in FIG. 5.
Figure 11:
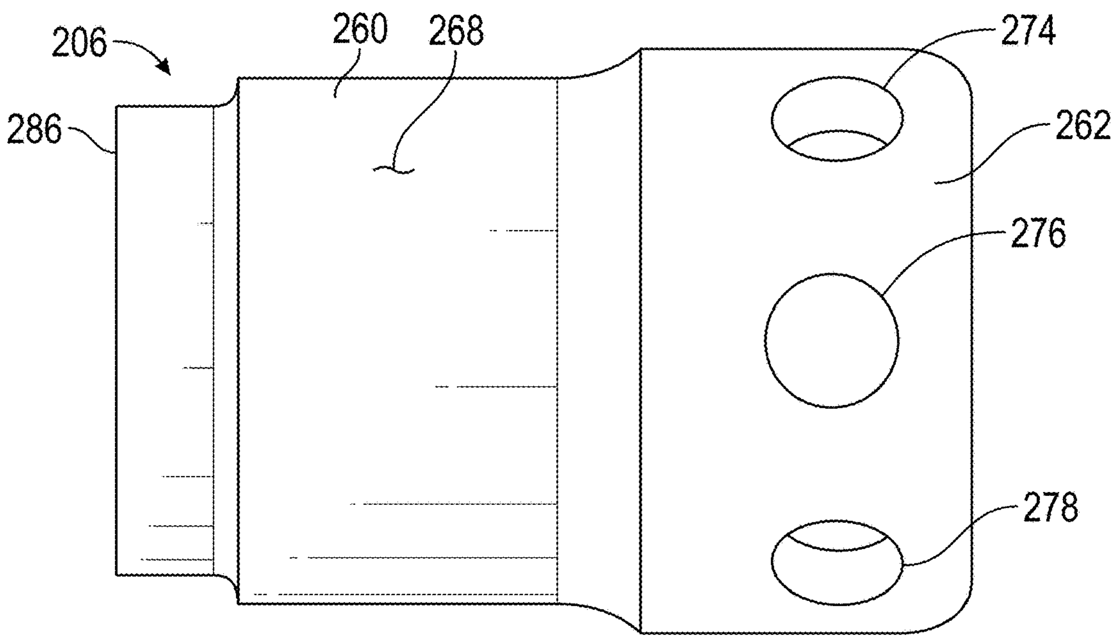
FIG. 11 is a second elevation view of the adapter sleeve shown in FIG. 9.

FIG. 10 and FIG. 11 are two elevation views of the adapter sleeve 206. This particular embodiment of the adapter sleeve 206 includes: a first portion 260; a second portion 262 adjacent to the first portion 260; and an interior passageway 264 (FIG. 6). The interior passageway 264 is at least partially defined within the first portion 260. In accordance with certain implementations, including the illustrated embodiment, the adapter sleeve 206 is realized as a unitary and one-piece component. For such implementations, the first portion 260 may be continuously formed to be integrated with the second portion 262, with or without intervening structure or features therebetween. In accordance with alternative embodiments (described in more detail below), an adapter sleeve can be realized as a plurality of physically distinct and separate components that are designed and configured to cooperate with one another in the desired and intended manner.

The interior passageway 264 of the adapter sleeve 206 is shaped, sized, and configured to removably receive and couple with the primary section 254 of the shaft 242 of the roller component 204. In this regard, the interior passageway 264 can be cylindrically shaped with an interior diameter that is slightly larger than the outer diameter of the primary section 254 (within the desired tolerance for the particular application). Although not totally visible in FIG. 6, the interior passageway 264 is realized as a through hole having an opening to receive the threaded mounting end 250 of the shaft 242.

The first portion 260 of the adapter sleeve 206 includes or defines an outer surface 268 that engages the support opening 232 of the roller fitting 202 when the roller arrangement 200 is in the deployed and assembled state. In contrast, the second portion 262 of the adapter sleeve 206 resides outside of the support opening 232 of the fitting 202 when the adapter sleeve 206 is secured to the fitting 202 (see, e.g., FIG. 5). Referring to FIG. 10 and FIG. 11, the second portion 262 may be wider (or have a larger diameter dimension) than the first portion 260, such that the second portion 262 limits how far the adapter sleeve 206 can be inserted into the support opening 232 of the fitting 202.

Figure 8:
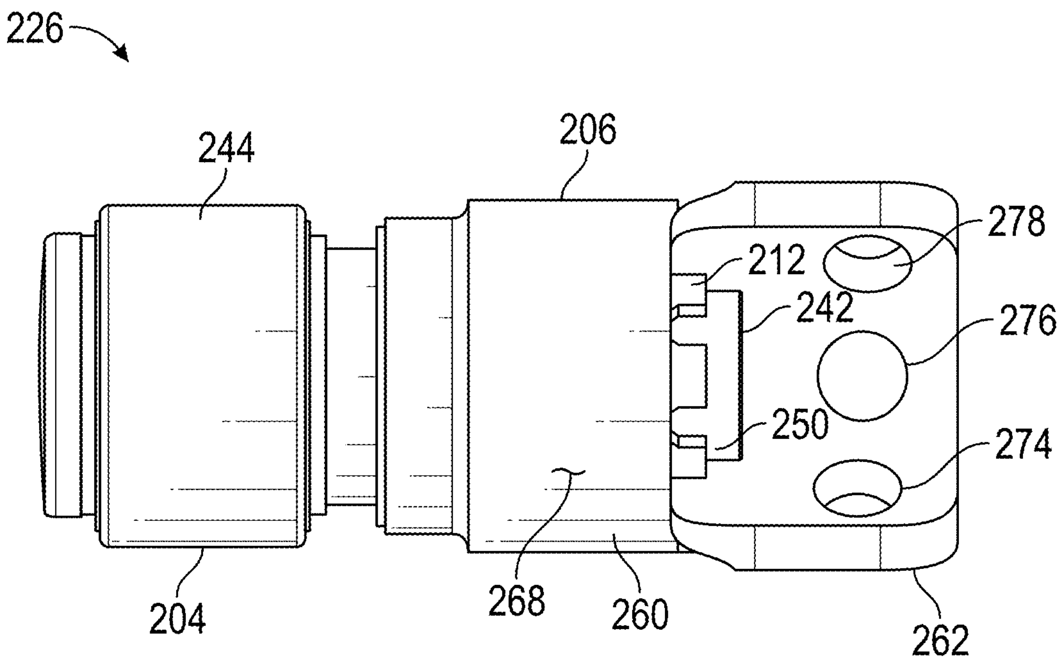
FIG. 8 is an elevation view of the roller assembly shown in FIG. 7.

In accordance with certain embodiments, the second portion 262 of the adapter sleeve 206 includes at least one sleeve mounting hole formed therein. The illustrated embodiment of the adapter sleeve 206 includes a plurality of laterally offset sleeve mounting holes formed in the second portion 262. More specifically, the second portion 262 includes three laterally offset sleeve mounting holes 274, 276, 278 (see FIG. 8 and FIG. 11). The sleeve mounting holes 274, 276, 278 are laterally offset from one another relative to the dimension/direction corresponding to the major longitudinal axis of the adapter sleeve 206. Referring to FIG. 8 and FIG. 11, the mounting hole 274 is located in the second portion 262 such that it is closer to the first portion 260 (as compared to the mounting hole 276 and the mounting hole 278). In contrast, the mounting hole 278 is located in the second portion 262 such that it is farther from the first portion 260 (as compared to the mounting hole 274 and the mounting hole 276). The mounting hole 276 is located in an intermediate position, wherein it is closer to the first portion 260 than the mounting hole 278, and farther from the first portion 260 than the mounting hole 274. It should be appreciated that alternative embodiments of an adapter sleeve can utilize only two offset mounting holes or more than three offset mounting holes, as appropriate for the particular application and use case. The purpose of the offset mounting holes 274, 276, 278 is explained in more detail below.

The roller assembly 226 can be assembled in the following manner before installation into its corresponding roller fitting 202. The washer 208 (see FIG. 6) is installed onto the shaft 242 of the roller component 204 and, thereafter, the adapter sleeve 206 is introduced onto the shaft 242 such that the washer 208 resides between the end of the adapter sleeve 206 and a bearing surface or feature of the shaft 242. For example, one side of the washer 208 may face a corresponding bearing surface 284 of the shaft 242, and the other side of the washer 208 may face an end surface 286 of the adapter sleeve 206 (see FIGS. 9-11). As mentioned above, the interior passageway 264 of the adapter sleeve 206 is shaped, sized, and configured to accommodate passage of the primary section 254 of the shaft 242. This allows the threaded mounting end 250 of the shaft 242 to be fed through the interior passageway 264 until it protrudes at least partially from the first portion 260 of the adapter sleeve 206 (see, e.g., FIG. 5, FIG. 7, and FIG. 8). The wheel 244 of the roller component 204 and the interior passageway 264 of the adapter sleeve 206 are shaped, sized, and configured to inhibit passage of the wheel 244 through the interior passageway 264. Thus, the wheel 244 remains exposed and positioned external to the adapter sleeve 206.

Next, the chamfered washer 210 is installed onto the exposed portion of the threaded mounting end 250 of the shaft 242, and the nut 212 is tightened on the threaded mounting end 250 to secure the roller component 204 to the adapter sleeve 206. In accordance with the illustrated embodiment, the nut 212 is a castellated nut that can accommodate installation of a cotter pin or other locking element that maintains the nut 212 on the shaft 242. Instead of a castellated nut, the roller assembly 226 may utilize any suitably configured threaded fastener that is compatible with the threaded mounting end 250.

Figure 7:
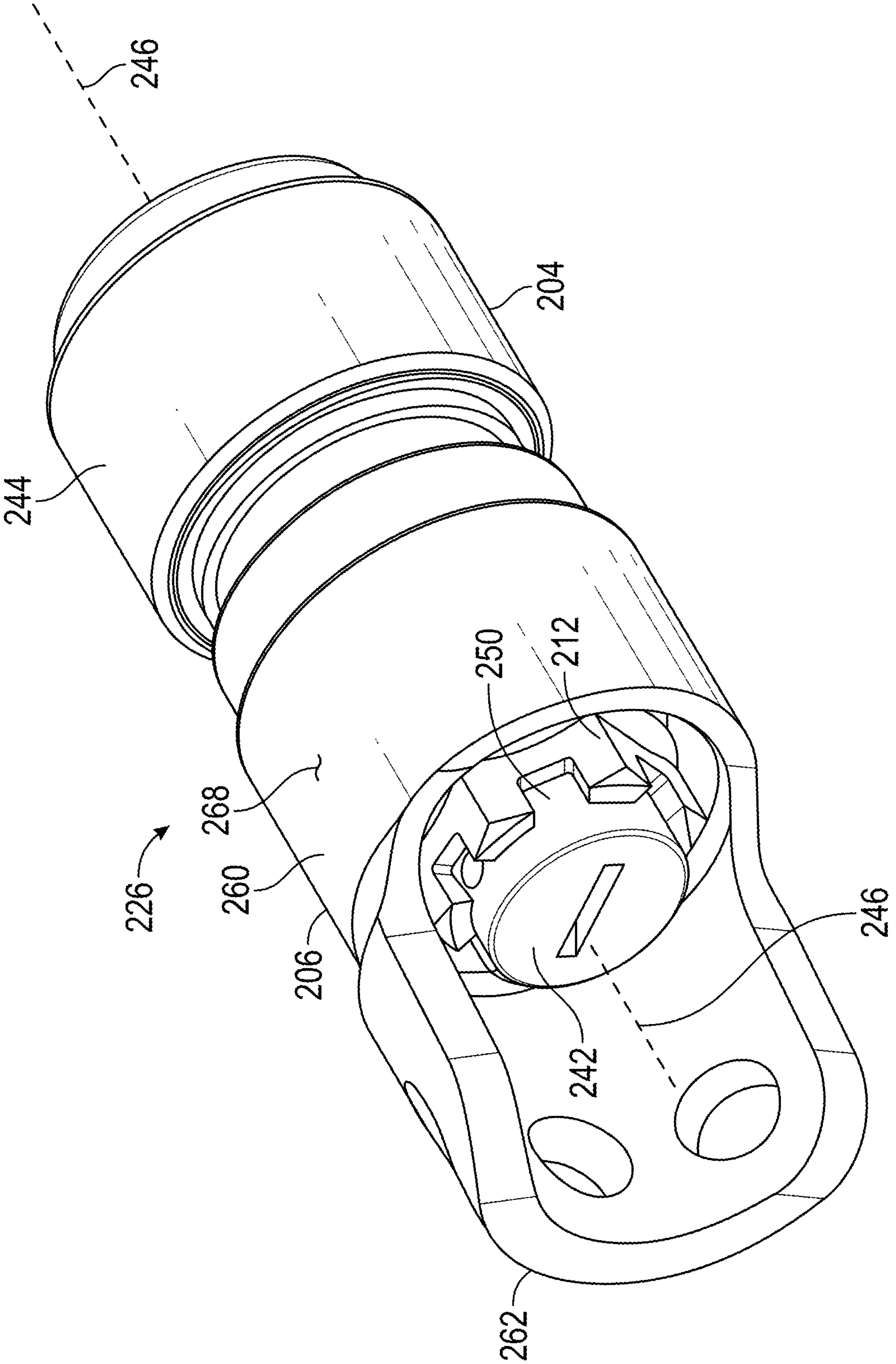
FIG. 7 is a perspective view of an exemplary embodiment of a roller assembly that is suitable for use with the roller arrangement shown in FIG. 5.

Referring to FIG. 7 and FIG. 8, the roller assembly 226 is shown in its assembled state. When assembled as shown, the nut 212 is threaded onto the threaded mounting end 250 and tightened by the desired amount. In this regard, the nut 212 engages the threaded mounting end 250 and can be tightened to urge the end surface 286 of the adapter sleeve 206 toward an abutment surface of the roller component 204, e.g., the bearing surface 284 of the shaft 242. Tightening the nut 212 serves to clamp the end of the adapter sleeve 206 against the bearing surface 284 (or against the washer 208). For the illustrated embodiment, the end surface 286 of the adapter sleeve 206 contacts one side of the washer 208, while the other side of the washer 208 contacts the bearing surface 284 of the shaft 242. If the washer 208 is omitted, the end surface 286 may directly contact the bearing surface 284.

As mentioned above, a cotter pin or other securing element can be installed to maintain the nut 212 in the installed position. In this way, the nut 212 can be used to removably connect the shaft 242 of the roller component 204 to the adapter sleeve 206. Once installed and tightened, the nut 212 inhibits or prevents rotation of the shaft 242 within the interior passageway 264 of the adapter sleeve 206. Although the shaft 242 may be fixed relative to the adapter sleeve 206, the wheel 244 remains free to spin about the shaft 242.

The nut 212 (with or without a cotter pin or locking element) represents one exemplary embodiment of a means for removably connecting the shaft 242 of the roller component 204 to the adapter sleeve 206. In alternate embodiments, the means for removably connecting can be realized as any type of fastener that is compatible with the end of the shaft 242. In this regard, the means for removably connecting may include, cooperate with, or be realized as any of the following, without limitation: a clamp; a locking pin; a retaining ring; a snap fitting; a clip; or a locking feature or component that cooperates with an integrally threaded version of the adapter sleeve 206.

The adapter sleeve 206 facilitates quick and easy installation and removal and installation of a standard, traditional, or "off the shelf" roller component 204, which may require occasional replacement or maintenance due to normal operating conditions. More specifically, the entire roller assembly 226 (which includes the roller component 204 coupled with the adapter sleeve 206) can pass through the support opening 232 of the roller fitting 202 in both directions. Referring to FIGS. 5-7, when the roller assembly 226 is properly oriented and aligned with the support opening 232 of the fitting 202 (as depicted in FIG. 6), the major longitudinal axis 246 of the shaft 242 generally corresponds to the longitudinal axis of the support opening 232. Notably, the support opening 232 and the wheel 244 are both shaped, sized, and configured to accommodate passage of the wheel 244 through the support opening 232. This arrangement allows the wheel 244 to be introduced at the outer end of the support opening 232, fed through the support opening 232, and positioned such that it extends beyond the inner end of the support opening 232 (as shown for the embodiment depicted in FIG. 5, and as schematically illustrated in FIG. 4). Accordingly, the roller assembly 226 can be removably mounted within the support opening 232 to facilitate quick and easy replacement of the roller component 204 (by pulling away from the track webs) as needed for routine maintenance.

Figure 12:
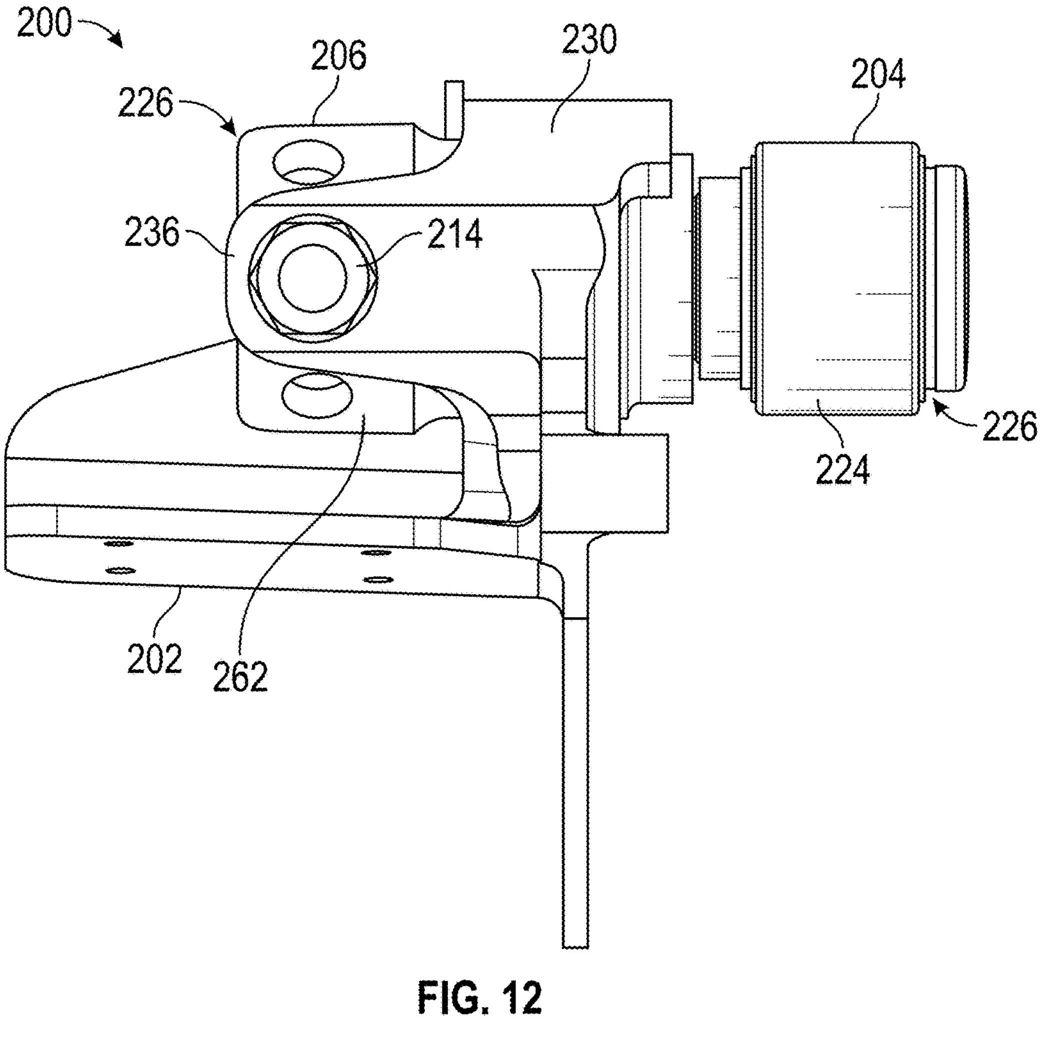
FIG. 12 is an elevation view of the roller arrangement shown in FIG. 5.

Referring to FIGS. 4, 5, and 12, the depicted embodiment of the roller assembly 226 can be mounted to the roller fitting 202 in the following manner. First, the roller assembly 226 is introduced and fed into the support opening 232 of the roller fitting 202. In many practical installation environments, there may not be sufficient space or clearance to accommodate insertion of the roller assembly 226 from its adapter sleeve side. In such scenarios, the roller assembly 226 is introduced to the roller fitting 202 by inserting the wheel 244 into the support opening 232. The roller assembly 226 is inserted and rotated into position such that the threaded fastener 214 (FIG. 6) and its washer 216 can be installed. In this regard, the threaded fastener 214 is shaped, sized, and otherwise configured to engage the fitting mounting hole 238 of the roller fitting 202 and to engage any of the sleeve mounting holes 274, 276, 278 of the adapter sleeve 206. Next, the support block 218 is installed onto the exposed end of the threaded fastener 214, followed by the nut 220. The nut 220 is tightened by the desired amount, resulting in the arrangement depicted in FIG. 5 and FIG. 12. In accordance with the illustrated embodiment, the nut 220 is a castellated nut that can accommodate installation of a cotter pin or other locking element that maintains the nut 220 on the threaded end of the fastener 214. Instead of a castellated nut, the roller arrangement 200 may utilize any suitably configured threaded fastener or component that is compatible with the end of the threaded fastener 214.

The threaded fastener 214 and the nut 220 can be used to removably secure the roller assembly 226 to the roller fitting 202 (and, therefore, to removably secure both the roller component 204 and the adapter sleeve 206 to the fitting 202). More specifically, the threaded fastener 214 and the nut 220 cooperate to secure the second portion 262 of the adapter sleeve 206 against the support structure 236 (flange) of the fitting 202. The threaded fastener 214, the nut 220, the washer 216 (if needed), and the support block 218 (if needed) represent an exemplary embodiment of a means for removably securing the adapter sleeve 206 to the roller fitting 202. The means for removably securing can be utilized to inhibit or prevent lateral movement of the adapter sleeve 206 relative to the fitting 202. In alternative embodiments, the means for removably securing may include, cooperate with, or be realized as any of the following, without limitation: a clamp; a locking pin; a rivet; a screw; serrations; a key/keyway arrangement.

FIG. 5 and FIG. 12 show the roller assembly 226 secured to the fitting 202 with the threaded fastener 214 installed into the sleeve mounting hole 276 (which is visible in FIG. 8 and FIG. 11). The sleeve mounting hole 274 can be used to adjust the roller assembly 226 outward, i.e., shift the wheel 244 toward the track 114 (away from the fitting 202). Conversely, the sleeve mounting hole 278 can be used to adjust the roller assembly 226 inward, i.e., shift the wheel 244 away from the track 114 (toward the fitting 202). In this way, the laterally offset arrangement of the sleeve mounting holes 274, 276, 278 facilitates lateral adjustment of the adapter sleeve 206 within the fitting 202 by selective engagement of the fastener 214 with one of the mounting holes 274, 276, 278. Lateral adjustment of the adapter sleeve 206 results in corresponding lateral adjustment of the wheel 244, which may be necessary to provide a desired amount of clearance between the wheel 244 and the respective track 114 in which the wheel 244 resides.

OTHER EMBODIMENTS

Figure 13:
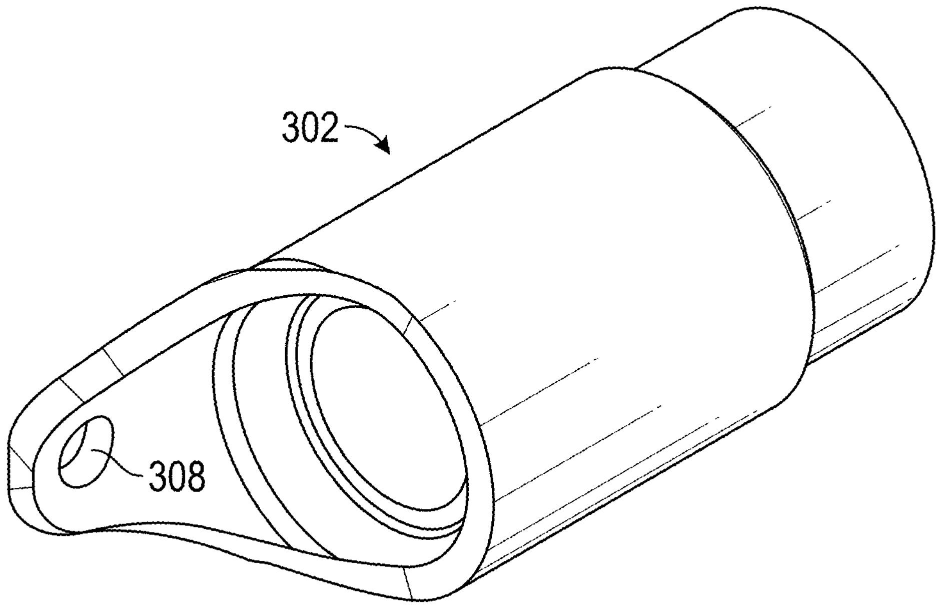
FIG. 13 is a perspective view of an alternative embodiment of an adapter sleeve.
Figure 14:
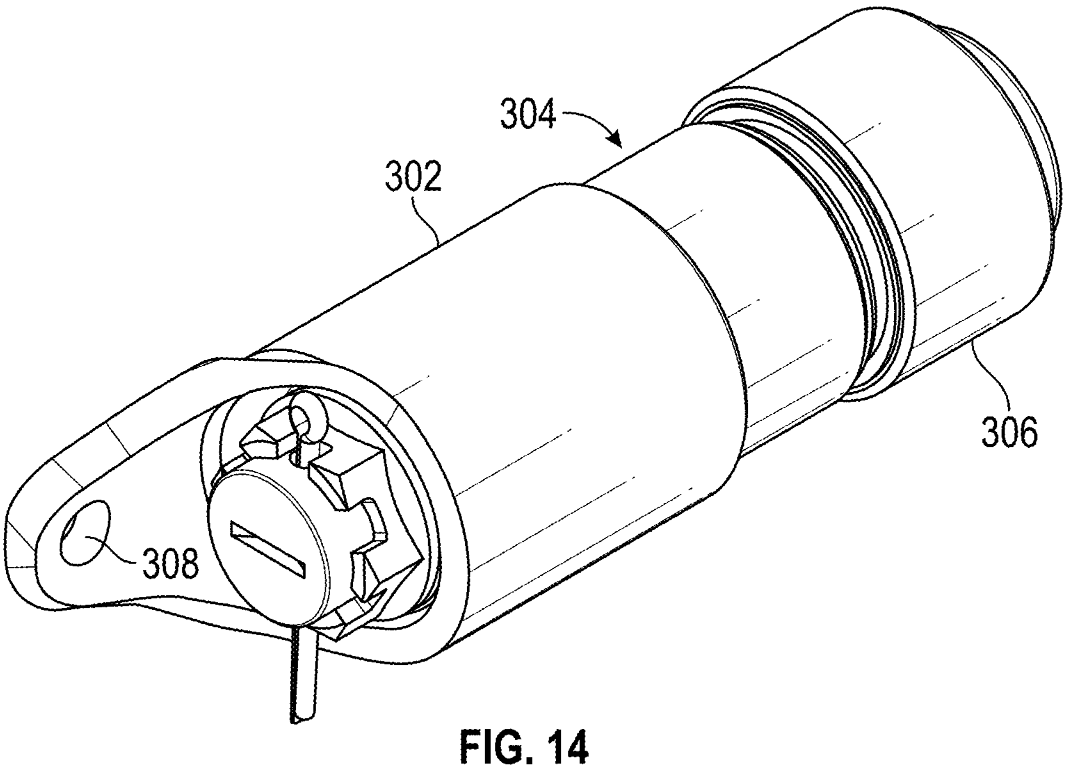
FIG. 14 is a perspective view of a roller assembly that utilizes the adapter sleeve shown in FIG. 13.

FIGS. 5-12 and most of the foregoing description relate to an exemplary embodiment that is suitable for use with a particular airframe and installation location. In accordance with other embodiments, the configuration and dimensions of the adapter sleeve may differ to accommodate the particular use case. As one non-limiting example, FIG. 13 is a perspective view of an alternative embodiment of an adapter sleeve 302, and FIG. 14 is a perspective view of a roller assembly 304 that utilizes the adapter sleeve 302. The depicted adapter sleeve 302 is longer than the previously described adapter sleeve 206, such that it can accommodate a longer roller component 306. Moreover, the adapter sleeve 302 has only one sleeve mounting hole 308 formed therein (rather than a plurality of mounting holes). Consequently, the adapter sleeve 302 and the roller assembly 304 do not support the lateral adjustment feature described above with reference to the adapter sleeve 206.

Figure 15:
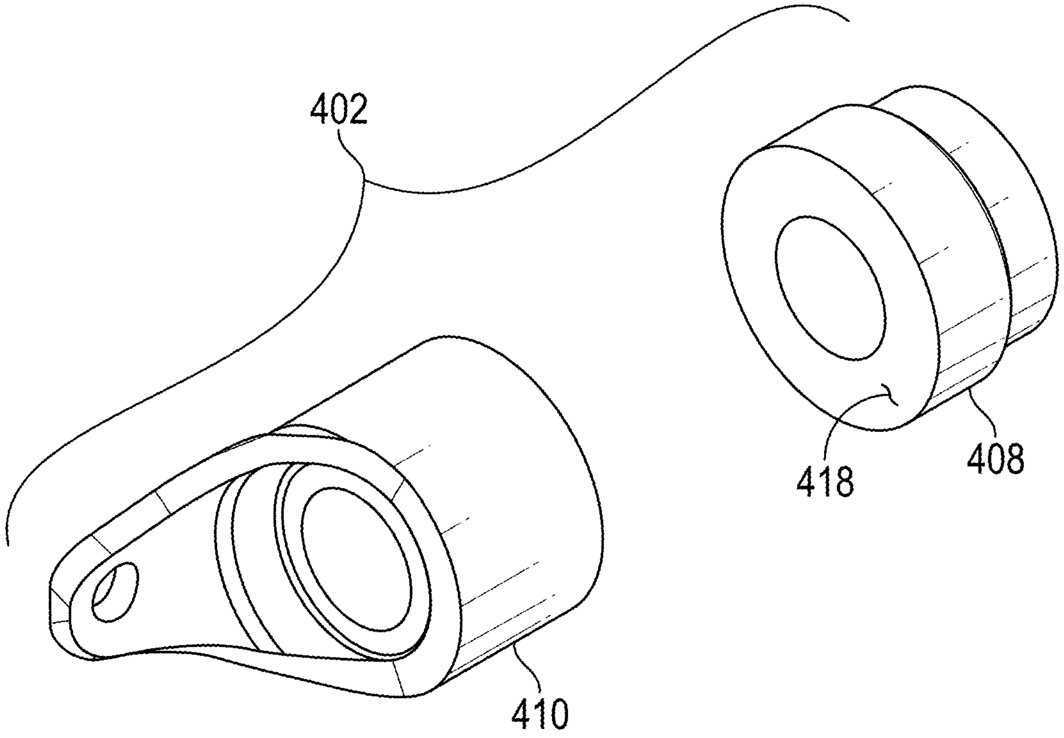
FIG. 15 is a perspective view of an alternative embodiment of an adapter sleeve.
Figure 16:
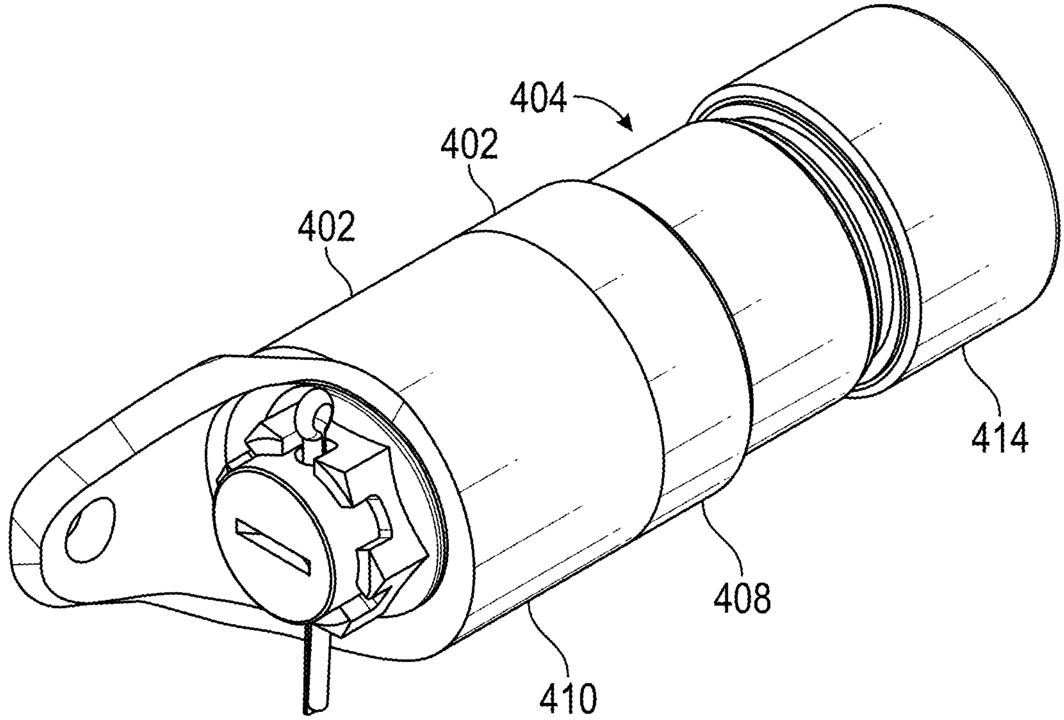
FIG. 16 is a perspective view of a roller assembly that utilizes the adapter sleeve shown in FIG. 15.

As another non-limiting example, FIG. 15 is a perspective view of an embodiment of a two-piece adapter sleeve 402, and FIG. 16 is a perspective view of a roller assembly 404 that utilizes the adapter sleeve 402. The adapter sleeve 402 is realized as two physically distinct sections: a head-side sleeve section 408; and a tail-side sleeve section 410. In this regard, the head-side sleeve section 408 is oriented toward the head or wheel of the roller component 414 when the roller assembly 404 is properly assembled. The tail-side sleeve section 410 is oriented toward the tail or threaded end of the roller component 414 when the roller assembly 404 is properly assembled. The head-side sleeve section 408 has a bearing surface 418 that is shaped, sized, and configured to engage a corresponding bearing surface (hidden from view) of the tail-side sleeve section 410. FIG. 4 depicts a one-piece adapter sleeve 150 in cross-section (on the right side) and a two-piece adapter sleeve in cross-section (on the left side). The two-piece adapter sleeve includes a head-side sleeve section 154 and a tail-side sleeve section 156 adjacent to the head-side sleeve section 154.

A multi-part adapter sleeve, such as the adapter sleeve 402, can be utilized in cramped installation environments, where there isn't sufficient free space behind the roller fitting to accommodate installation and removal of the fully assembled roller assembly. Referring to FIG. 4, FIG. 5, and FIG. 12, if additional structure, aircraft components, and/or hardware are located in near proximity to the adapter sleeve (in its installed location within the fitting), then it may be difficult or impossible to install the fully assembled roller assembly 404 without removing or partially disassembling those additional elements. If a compatible and appropriately dimensioned multi-part adapter sleeve is utilized, the securing nut can be removed first, followed by the tail-side sleeve section, and followed by the head-side sleeve section. Thereafter, the roller component (by itself) can be removed from the fitting. Replacement of a new roller component and installation of the two-piece adapter sleeve is accomplished in the reverse order. The split configuration of the adapter sleeve can be used with installation environments that have enough clearance space to accommodate the roller component, but insufficient clearance space to accommodate the assembled roller assembly (which is larger due to the inclusion of the adapter sleeve).

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A roller arrangement for a moveable control surface of an aircraft component, the roller arrangement comprising:

a roller component having a shaft and a wheel coupled to a roller end of the shaft, the wheel configured to rotate about a major longitudinal axis of the shaft;

a fitting couplable to the moveable control surface, the fitting comprising a support opening defined therein, the support opening shaped, sized, and configured to accommodate passage of the wheel therethrough;

an adapter sleeve comprising an interior passageway defined therein, the interior passageway shaped, sized, and configured to removably receive and couple with the shaft of the roller component;

means for removably securing the adapter sleeve to the fitting, to inhibit lateral movement of the adapter sleeve relative to the fitting; and means for removably connecting the shaft to the adapter sleeve, wherein the means for removably connecting inhibits rotation of the shaft within the interior passageway of the adapter sleeve.

2. The roller arrangement of claim 1, wherein:

the shaft has a threaded mounting end opposite the roller end;

the means for removably connecting comprises a threaded fastener that is compatible with the threaded mounting end; and the threaded fastener engages the threaded mounting end to urge a face surface of the adapter sleeve toward an abutment surface of the roller component.

3. The roller arrangement of claim 2, wherein:

the threaded fastener engages the threaded mounting end to clamp the adapter sleeve against the abutment surface of the roller component.

4. The roller arrangement of claim 1, wherein:

the wheel is larger in diameter than the shaft;

the interior passageway of the adapter sleeve is shaped, sized, and configured to accommodate passage of the shaft therethrough; and the interior passageway of the adapter sleeve is shaped, sized, and configured to inhibit passage of the wheel therethrough.

5. The roller arrangement of claim 1, wherein the adapter sleeve is realized as a plurality of physically distinct and separate components.

6. The roller arrangement of claim 1, wherein the adapter sleeve comprises:

a first portion having an outer surface that engages the support opening of the fitting, the interior passageway at least partially defined within the first portion; and a second portion adjacent to the first portion, wherein the second portion resides outside of the support opening of the fitting when the adapter sleeve is secured to the fitting.

7. The roller arrangement of claim 6, wherein:

the second portion includes a sleeve mounting hole formed therein;

the fitting comprises a support structure having a fitting mounting hole formed therein; and the means for removably securing the adapter sleeve to the fitting comprises a fastener assembly configured to engage the sleeve mounting hole and the fitting mounting hole, and to secure the second portion of the adapter sleeve against the support structure of the fitting.

8. The roller arrangement of claim 6, wherein:

the second portion includes a plurality of laterally offset sleeve mounting holes formed therein;

the fitting comprises a support structure having a fitting mounting hole formed therein;

the means for removably securing the adapter sleeve to the fitting comprises a fastener assembly configured to engage the fitting mounting hole and any of the sleeve mounting holes, and to secure the second portion of the adapter sleeve against the support structure of the fitting; and the plurality of sleeve mounting holes are arranged to facilitate lateral adjustment of the adapter sleeve within the fitting by selective engagement of the fastener assembly with one of the sleeve mounting holes.

9. A roller arrangement for a moveable control surface of an aircraft component, the roller arrangement comprising:

a roller component having a shaft and a wheel coupled to a roller end of the shaft, the wheel configured to rotate about a major longitudinal axis of the shaft;

a fitting couplable to the moveable control surface, the fitting comprising a support opening defined therein, the support opening shaped, sized, and configured to accommodate passage of the wheel therethrough;

an adapter sleeve comprising an interior passageway defined therein, the interior passageway shaped, sized, and configured to removably receive and couple with the shaft of the roller component; and means for removably securing the adapter sleeve to the fitting, to inhibit lateral movement of the adapter sleeve relative to the fitting, wherein the adapter sleeve is realized as a unitary component.

10. A moveable control surface assembly for a component of an aircraft, the moveable control surface assembly comprising:

a moveable control surface;

a fitting coupled to the moveable control surface, the fitting comprising a support opening defined therein; and a roller assembly removably mounted within the support opening, the roller assembly configured for rolling engagement with a track of the component, the roller assembly comprising:

a roller component having a shaft and a wheel coupled to a roller end of the shaft, the wheel configured to rotate about a major longitudinal axis of the shaft, wherein the support opening of the fitting is shaped, sized, and configured to accommodate passage of the wheel therethrough; and an adapter sleeve comprising an interior passageway defined therein, the interior passageway shaped, sized, and configured to removably receive and couple with the shaft of the roller component; wherein the adapter sleeve comprises:

a first portion having an outer surface that engages the support opening of the fitting, the interior passageway at least partially defined within the first portion; and a second portion adjacent to the first portion, wherein the second portion resides outside of the support opening of the fitting when the adapter sleeve is secured to the fitting;

wherein the second portion includes a sleeve mounting hole formed therein;

wherein the fitting comprises a support structure having a fitting mounting hole formed therein; and wherein the means for removably securing the adapter sleeve to the fitting comprises a fastener assembly configured to engage the sleeve mounting hole and the fitting mounting hole, and to secure the second portion of the adapter sleeve against the support structure of the fitting.

11. The assembly of claim 10, wherein:

the wheel is larger in diameter than the shaft;

the interior passageway of the adapter sleeve is shaped, sized, and configured to accommodate passage of the shaft therethrough; and the interior passageway of the adapter sleeve is shaped, sized, and configured to inhibit passage the wheel therethrough.

12. The assembly of claim 10, wherein the adapter sleeve is realized as a plurality of physically distinct and separate components.

13. The assembly of claim 10, wherein:

the second portion includes a plurality of laterally offset sleeve mounting holes formed therein;

the fitting comprises a support structure having a fitting mounting hole formed therein;

the means for removably securing the adapter sleeve to the fitting comprises a fastener assembly configured to engage the fitting mounting hole and any of the sleeve mounting holes, and to secure the second portion of the adapter sleeve against the support structure of the fitting; and the plurality of sleeve mounting holes are arranged to facilitate lateral adjustment of the adapter sleeve within the fitting by selective engagement of the fastener assembly with one of the sleeve mounting holes.

14. A roller assembly for an aircraft having an aerodynamic component, a moveable control surface associated with the aerodynamic component, a track coupled to the aerodynamic component, and a fitting coupled to the moveable control surface, the roller assembly comprising:

a roller component having a shaft and a wheel coupled to a roller end of the shaft, the wheel configured to rotate about a major longitudinal axis of the shaft, wherein the wheel is configured to engage the track, and wherein the wheel is shaped, sized, and configured to pass through a support opening of the fitting;

an adapter sleeve comprising an interior passageway defined therein, the interior passageway shaped, sized, and configured to removably receive and couple with the shaft of the roller component;

means for removably securing the adapter sleeve to the fitting, to inhibit lateral movement of the adapter sleeve relative to the fitting; and means for removably connecting the shaft to the adapter sleeve, wherein the means for removably connecting inhibits rotation of the shaft within the interior passageway of the adapter sleeve.

15. The roller assembly of claim 14, wherein the adapter sleeve comprises:

a first portion having an outer surface that engages the support opening of the fitting, the interior passageway at least partially defined within the first portion; and a second portion adjacent to the first portion, wherein the second portion resides outside of the support opening of the fitting when the adapter sleeve is secured to the fitting; wherein:

the second portion includes a sleeve mounting hole formed therein;

the fitting comprises a support structure having a fitting mounting hole formed therein; and the means for removably securing the adapter sleeve to the fitting comprises a fastener assembly configured to engage the sleeve mounting hole and the fitting mounting hole, and to secure the second portion of the adapter sleeve against the support structure of the fitting.

16. The roller assembly of claim 15, wherein:

the second portion includes a plurality of laterally offset sleeve mounting holes formed therein;

the fitting comprises a support structure having a fitting mounting hole formed therein;

the means for removably securing the adapter sleeve to the fitting comprises a fastener assembly configured to engage the fitting mounting hole and any of the sleeve mounting holes, and to secure the second portion of the adapter sleeve against the support structure of the fitting; and the plurality of sleeve mounting holes are arranged to facilitate lateral adjustment of the adapter sleeve within the fitting by selective engagement of the fastener assembly with one of the sleeve mounting holes.

* * * * *